March 9, 1937. C. HERRMANN Re. 20,284
DEVICE FOR THE AFTER TREATMENT OF FILAMENTS
Original Filed March 8, 1932
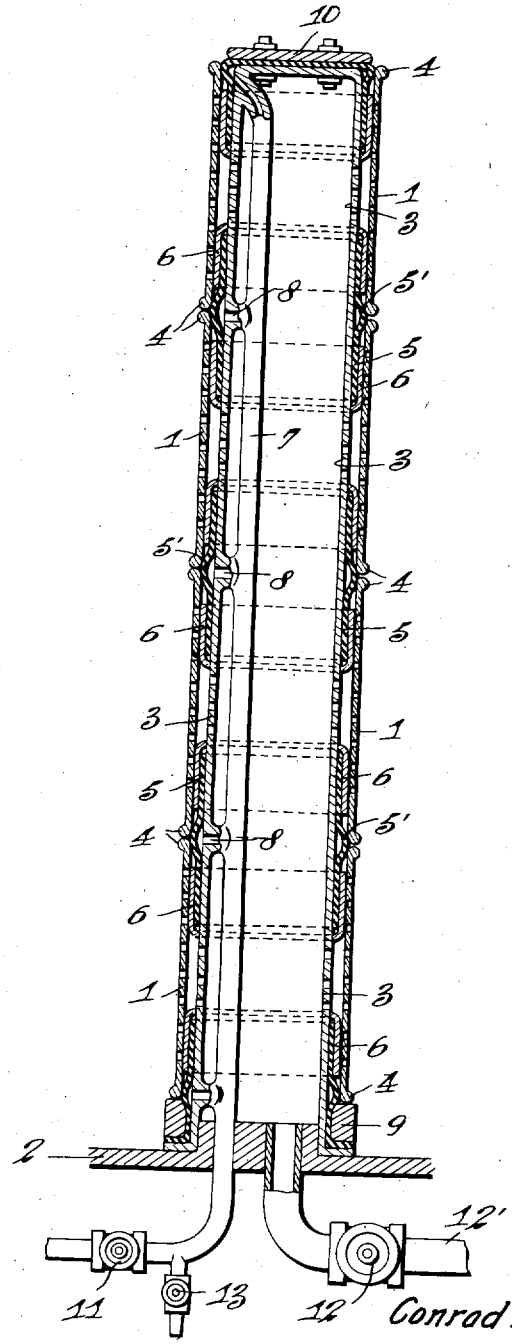
Inventor
Conrad Herrmann.
By Thomas H. Byron
Attorney Reissued Mar. 9, 1937 Re. 20,284

UNITED STATES PATENT OFFICE 20,284

DEVICE FOR THE AFTER TREATMENT OF FILAMENTS

Conrad Herrmann, Wuppertal-Elberfeld, Germany, assignor to North American Rayon Corporation, a corporation of Delaware Original No. 1,921,123, dated August 8, 1933, Serial No. 597,510, March 8, 1932. Application for reissue August 6, 1935, Serial No. 34,928. In Germany April 27, 1931

12 Claims. (Cl. 18—8)

My present invention has to do with the vacuum, pressure washing, or other liquid treating of artificial filaments.

More specifically my invention relates to an apparatus for use in the washing, bleaching, desulphurization, oiling, sizing, dyeing, drying, etc. of artificial filaments produced in accordance with the wet spinning process.

One object of the present invention is to provide a mechanism which may be used in conjunction with the ordinary treating tanks now commonly used and which will result in a saving of time and labor.

Another object of the present invention is to provide a means which while labor and time saving as pointed out above, also acts to aid in the more efficient treatment of the filaments, etc.

Other objects will become apparent from a perusal of the following specification and a study of the accompanying drawing, which discloses an elevational cross section of my improved apparatus.

Ordinarily in the wet treatment of artificial filaments a series of superimposed spools are positioned above an opening in the bottom of the tank. In order to properly position these spools and to insulate the tier against leakage, etc., the use of some type of gasket and much manual labor is necessary. These disadvantages disappear when my new device is used.

Referring now to the drawing, the spinning spools (1) containing the filaments are placed about the perforated pipe (3). This pipe is permanently fastened to the bottom (2) of a washing tank or a washing carriage. This pipe (3) provides the necessary support for a stack or tier of spools and serves as a means of conducting the pressure or vacuum applied to the spools. Each spool has a beaded edge (4), and the pipe (3) is provided with the following means in order that these beaded edges (4) may be held in liquid and gas-tight connection therewith. These means comprise soft rubber portions of tubing (5) which are slid over the pipe (3). These portions of rubber tubing are each supported in the proper position by means of two caps 6—6 which are slid over the tubing from both ends in order to grip it. These caps 6—6 hold the tubing (5) pressed tightly against the perforated tube (3) so that a liquid and air-tight junction is provided. The tubing is arranged in such a manner that a loose central position 5′ is provided. This free portion of the tube (5) is so placed that it assumes a bellying position where the beaded edges (4) of the superimposed spools (1) meet. That portion of the pipe (1) which is covered by the rubber tube (5) need not be perforated. Between the outer surface of the pipe (3) and the inner free portion of the rubber tube (5′) either compressed air or some liquid supplied by hydraulic pressure, such as water, may be introduced by means of the feed pipe (7) and the openings (8). The pressure applied need only be such that a bellying of the portion 5′ is produced. This pressure causes the portions 5′ to press outwardly against the adjoining beaded portions (4) and thus form a liquid and air tight seal between them. It is obvious that in the event of the employment of pressure washing the auxiliary pressure in the pipe (7), must be higher than the internal pressure of the washing water. It is to be noted that the portion 5′ contact with the spools (1) only at the portions thereof which are unperforated.

The clamping ring (9) situated at the lower end of the tube (1) takes the place of a headed edge for the lowermost spool to rest upon. Similarly, the screw cover (10) assumes a like duty at the top portion of the pipe.

In operation the following procedure is employed: After the washing apparatus is empty the valve (11) in the pressure water line and the valve (12) in the water washing line are both closed. The spinning spools to be washed are placed around the pipe (3) in superimposed position. The valve (11) is then opened so that either air or some liquid under the influence of hydraulic pressure, such as water, is allowed to enter the pipe (7), and so pass through (8) and swell or belly out the loose portion 5′ of the rubber sleeve (5). In this way all of the packings are brought in tight contact with the beaded edges of the stacked spools. The valve (12) is then opened for the feeding of the washing water. After sufficient washing water has passed through the spools, the valve (11) and (12) are closed, and the air or liquid remaining in the pipe (7) is allowed to escape through the blow-off valve (13). Thus the rubber rings or tubes 5′ assume their former position and the washed spools may be removed and other spools placed upon the pipe.

It is to be understood that although the foregoing discussion was specific to the use of water for the pressure washing of artificial filaments, the apparatus may be likewise used for desulphurization, bleaching, reviving, oiling, sizing, dyeing, and even drying of the filaments. In short this apparatus may be used for any of the methods used in the after treatment of filaments.

As suggested above, the inlet pipe 12' supplied by the valve (12) may be used in order that a vacuum may be created within the perforated tube (3) and the water or other treating liquids sucked therethrough.

Having now set forth my invention as required by the patent statutes, what I desire to claim is:

1. In a device of the character set forth, a tank bottom, a standing perforated pipe rigidly connected therewith, an inlet through the tank bottom through which treating liquids may pass, another inlet joining the said pipe at spaced intervals throughout its length, flexible gaskets surrounding the said pipe at spaced intervals, and inlets from the second named inlet pipe by means of which pressure may be applied within the gaskets in order to swell them.

2. In combination, an upright perforated support, tubular in form, a series of spools arranged in superimposed position around said support, flexible coverings arranged to cover certain of the perforations on said support, and positioned adjacent the meeting edges of the said spools, and means for supplying fluid pressure to the perforations so covered that the flexible support will be caused to expand against and seal the said meeting edges of the spools.

3. A sealing means for use in the after treatment of filaments, etc., comprising a perforated support and a flexible covering for one of the perforations therein, and a tube leading to the perforation so covered so that pressure may be applied through the said perforation in order to expand the said flexible covering.

4. In combination, a perforated tube-like support for spooled filaments, etc., a plurality of flexible coverings for said support, located at spaced points on said support, and tubes for the application of fluid pressure whereby pressure may be applied to the perforations covered by said coverings, and said flexible coverings may be expanded.

5. In combination, a perforated tube-like support for spooled filaments and the like, a series of spools arranged in superimposed position around said support, a plurality of flexible coverings for said support located at spaced points thereon, and means for the application of fluid pressure whereby pressure may be supplied to the perforations covered by said coverings, and said coverings, may be expanded so that the meeting edges of the spools are secured against the passage of fluids.

6. In an apparatus for the fluid treatment of thread, a perforated thread holder, means for holding the thread holder and directing fluid thereto, means at each end of the holding means to seal the ends of the thread holder, means for collapsing the sealing means to permit serving the spindle, and fluid pressure means to press the sealing means against the thread holder during fluid treatment of the thread holder.

7. In an apparatus for the fluid treatment of thread, a perforated bobbin, means for holding and directing fluid to the bobbin, means at each end of the holding means to seal the ends of the bobbin, and fluid means whereby the sealing means may be either collapsed or given a tendency to expand.

8. In a sealing apparatus a cylindrical member, a member encircling a portion of the said member, and means for sealing the space between the members comprising a flexible ring on one said member and fluid pressure means for collapsing and expanding the said ring, the circumference of the said ring when collapsed being less than the adjacent circumference of the other member and the circumference of the said ring when expanded being such as to form sealing engagement under pressure with the said other member.

9. In combination, a perforated tube-like support, having a plurality of perforations, a flexible covering for one of the perforations of said perforated support, and a separate tube leading to the said covered perforation.

10. In combination, a perforated tube-like support, having a plurality of perforations, flexible coverings for certain of the perforations of said perforated support, and tubes leading to each of the said covered perforations for supplying fluid thereto independent of the liquid for treating the filaments.

11. A device for the treatment of filaments, comprising a perforated tube-like support and a perforated carrier for filaments adapted to be supported by said support, flexible covering for perforations in said perforated support opposite the end portions of said carriers, and separate tubes leading to said covered perforations.

12. A device for use in the treatment of filaments, comprising a perforated tube-like support, a plurality of perforated carriers for filaments adapted to be supported by said perforated support, flexible coverings for perforations in said perforated support opposite the end portions of said filament carriers, and tubes leading to each of said covered perforations for supplying fluid thereto independent of the liquid for treating the filaments.

CONRAD HERRMANN.